US008691381B2

(12) United States Patent
Tynan, Jr. et al.

(10) Patent No.: US 8,691,381 B2
(45) Date of Patent: Apr. 8, 2014

(54) EDGE COATINGS FOR TAPES

(75) Inventors: John K. Tynan, Jr., Port Huron, MI (US); Mark A. Lewandowski, Fort Gratiot, MI (US); Deborah Anne Chrzanowski, Corunna (CA); Paul E. Rhude, Fort Gratiot, MI (US)

(73) Assignee: Intertape Polymer Corp., Bradenton, FL (US)

( * ) Notice: Subject to any disclaimer, the term of this patent is extended or adjusted under 35 U.S.C. 154(b) by 0 days.

(21) Appl. No.: 12/436,293

(22) Filed: May 6, 2009

(65) Prior Publication Data

US 2009/0280301 A1 Nov. 12, 2009
US 2010/0304096 A2 Dec. 2, 2010

Related U.S. Application Data

(60) Provisional application No. 61/050,843, filed on May 6, 2008, provisional application No. 61/086,176, filed on Aug. 5, 2008, provisional application No. 61/122,538, filed on Dec. 15, 2008.

(51) Int. Cl.
*B32B 7/12* (2006.01)
*B32B 15/01* (2006.01)

(52) U.S. Cl.
USPC ............................. 428/343; 428/40.1; 428/355

(58) Field of Classification Search
USPC ................................... 428/343, 355
See application file for complete search history.

(56) References Cited

U.S. PATENT DOCUMENTS

| | | | |
|---|---|---|---|
| 1,683,453 A | 9/1928 | Farrell | |
| 3,347,362 A * | 10/1967 | Rabuse et al. | 428/194 |
| 3,819,434 A | 6/1974 | Dembiak et al. | |
| 4,302,337 A | 11/1981 | Larson et al. | |
| 4,675,177 A * | 6/1987 | Geary | 424/47 |
| 4,710,539 A * | 12/1987 | Siadat et al. | 525/59 |
| 4,751,269 A | 6/1988 | Bonk et al. | |
| 4,781,958 A | 11/1988 | Gilbert | |
| 4,855,278 A | 8/1989 | Igarashi et al. | |
| 4,946,728 A | 8/1990 | Ikeda et al. | |
| 4,988,550 A | 1/1991 | Keyser et al. | |
| 5,039,197 A | 8/1991 | Rawlyk | |
| 5,043,538 A | 8/1991 | Hughey, Jr. et al. | |
| 5,188,883 A | 2/1993 | Rawlyk | |
| 5,472,559 A | 12/1995 | Cayford et al. | |
| 5,635,265 A * | 6/1997 | Potokar | 428/43 |
| 5,698,139 A * | 12/1997 | Alper | 516/185 |
| 5,851,433 A | 12/1998 | Hart et al. | |
| 6,596,808 B1 * | 7/2003 | Newberth et al. | 524/812 |
| 6,623,825 B2 | 9/2003 | Wong | |
| 6,703,245 B2 * | 3/2004 | Sumitani et al. | 436/136 |
| 6,828,008 B2 | 12/2004 | Gruber | |
| 7,060,352 B2 | 6/2006 | Wright | |
| 7,182,988 B2 | 2/2007 | McCain | |
| 2003/0012950 A1 | 1/2003 | Kieser et al. | |
| 2003/0143393 A1 * | 7/2003 | David et al. | 428/355 AC |
| 2003/0207085 A1 | 11/2003 | Gruber | |
| 2004/0022952 A1 * | 2/2004 | Wong | 427/385.5 |
| 2004/0053044 A1 * | 3/2004 | Moreno et al. | 428/343 |
| 2004/0058171 A1 * | 3/2004 | Sasaki et al. | 428/448 |
| 2004/0063020 A1 * | 4/2004 | Stegamat et al. | 430/137.1 |
| 2005/0197441 A1 * | 9/2005 | Shibutani et al. | 524/459 |
| 2006/0198997 A1 * | 9/2006 | Goossens et al. | 428/304.4 |
| 2006/0263596 A1 * | 11/2006 | Bamborough et al. | 428/354 |
| 2007/0119776 A1 * | 5/2007 | Isaka et al. | 210/601 |
| 2008/0019078 A1 | 1/2008 | Arimitsu et al. | |
| 2008/0175877 A1 * | 7/2008 | Ward | 424/401 |
| 2008/0292880 A1 | 11/2008 | Hansen | |
| 2009/0123526 A1 * | 5/2009 | Kuribayashi | 424/448 |
| 2009/0245939 A1 * | 10/2009 | Burns et al. | 405/128.75 |

FOREIGN PATENT DOCUMENTS

| | | |
|---|---|---|
| JP | SHO 50-10353 | 4/1975 |
| JP | 58-038776 | 3/1983 |
| JP | 59-043083 | 3/1984 |
| JP | 59-159874 | 9/1984 |

OTHER PUBLICATIONS

Pressure Sensitive Adhesives Technology by Benedek et al, pp. 185-186, Marcel Dekker, Inc. no month—1997.*
Ono, T. et al., "Lipophilic polyelectrolyte gels as super-absorbent polymers for nonpolar organic solvents," Nature Materials, vol. 6, pp. 429-433 (Jun. 2007).
Ono, T. et al., "Discontinuous swelling behaviors of lipophilic polyelectrolyte gels in non-polar media," Soft Matter, 4, pp. 748-750 (2008).
European Search Report, European Application No. 09159525.6 (Aug. 28, 2009).
European Search Report, European Application No. 10196458.3 (Feb. 15, 2011).
US, Office Action, U.S. Appl. No. 12/838,085 (Sep. 15, 2010).
US, Office Action, U.S. Appl. No. 12/838,085 (Feb. 25, 2011).
US, Advisory Action, U.S. Appl. No. 12/838,085 (May 2, 2011).
EP, Examination Report, European Application No. 09159525.6 (Apr. 11, 2011).
US, Office Action, U.S. Appl. No. 13/291,626 (Dec. 22, 2011).
Richard J. Lewis, Jr., Hawley Condensed Chemical Dictionary, 13th Edition.
US, Office Action, U.S. Appl. No. 12/838,085 (Mar. 22, 2012).
US, Office Action, U.S. Appl. No. 13/291,626 (Jun. 4, 2012).
Liberto, User's Guide to Powder Coating, 4th Edition (2003).
Utech, Bob, A Guide to High Performance Powder Coating (2002).

* cited by examiner

*Primary Examiner* — Callie Shosho
*Assistant Examiner* — Samir Shah
(74) *Attorney, Agent, or Firm* — Thompson Hine, L.L.P.

(57) ABSTRACT

Disclosed is a tape including a substrate having an adhesive layer applied thereto and an edge coating. The substrate and the adhesive together provide at least one masking edge where the edge coating is applied. The edge coating includes a lipophilic agent, a flocculating agent, or combinations thereof. The edge coating provides the tape with enhanced masking ability by preventing paints, varnishes, paint strippers, and other coating compositions from infiltrating the tape substrate or the interface between the tape and an adherend.

11 Claims, No Drawings

EDGE COATINGS FOR TAPES

This application claims priority to U.S. provisional patent application Ser. No. 61/050,843 filed May 6, 2008, to U.S. provisional patent application Ser. No. 61/086,176 filed Aug. 5, 2008, and to U.S. provisional patent application Ser. No. 61/122,538 filed Dec. 15, 2008.

FIELD OF THE INVENTION

The present invention relates to edge coatings for adhesive tapes that improve the ability of the tape to provide a sharp mask line.

BACKGROUND OF THE INVENTION

U.S. Pat. No. 6,828,008 to Gruber discloses providing an edge coating of a super-absorbent polymer ("SAP") on the tape to prevent paints and other liquids from wicking into the paper or fabric substrate for the tape or from bleeding between the tape substrate and the surface to which the tape is applied (the "adherend").

SAPs have a strong affinity for water and appear to function in the Gruber tapes by absorbing water from water-based coatings, such as latex paints. This appears to increase the viscosity of the coating and thereby reduce its tendency to be absorbed into the tape backing or to pass between the adhesive and the adherend thereby.

SUMMARY OF THE INVENTION

One embodiment of the invention is an improved pressure-sensitive tape, and, more particularly, an improved pressure-sensitive masking tape in which an edge coating is provided that enhances the masking ability of the tape by preventing paints, varnishes, paint strippers, and other coating compositions, including corrosives, from infiltrating the tape substrate or the interface between the tape and the adherend.

In accordance with one embodiment, the tape comprises a substrate having an adhesive layer and at least one masking edge and an edge coating applied to the at least one masking edge. The edge coating includes a lipophilic agent, a flocculating agent, or a combination thereof.

In another embodiment, the edge coating is applied to both masking edges of the tape.

Another embodiment is a masking material for defining a mask line between a masked area and an unmasked area of a surface. The masking material comprises a substrate having an adhesive layer applied thereto and the substrate and the adhesive together having at least one masking edge, and an edge coating applied to the at least one masking edge, wherein the edge coating includes a lipophilic agent, a flocculating agent, or a combination thereof.

DETAILED DESCRIPTION

One example of an adhesive tape is a pressure sensitive tape such as conventional masking tape. Other tapes that can be used in conjunction with the invention are duct tapes, vinyl tapes, foil tapes, etc. Typically tapes will be fabricated from creped or uncreped paper substrates, plastic film substrates, foil substrates, etc. The tape includes a pressure sensitive adhesive layer disposed on one surface of a backing and an edge coating applied to one or both edges of the tape. The tape may be wound upon itself in the form of a roll of tape.

Examples of tape backings include backings, release liners, release coated materials and combinations thereof. The tape construction may include polymeric film, paper, metal foil, foam, reinforced, double-faced and transfer tape. Other possible tape constructions include composite backings, composite liners, multi-layer backings and combinations thereof. The tape may include other layers and elements found in conventional adhesive tapes, such as coatings for rendering the tape impervious or resistant to fluids, reinforcements for adding strength to the tape, release agents, etc.

Examples of tape backings include cellophane, acetate, fiber, polyester, vinyl, polyethylene, polypropylene including, e.g., monoaxially oriented polypropylene and biaxially oriented polypropylene, polytetrafluoroethylene, polyvinylfluoroethylene, polyurethane, polyimide, paper (e.g., kraft paper), woven webs (e.g., cotton, polyester, nylon and glass), nonwoven webs, foil (e.g., aluminum, lead, copper, stainless steel and brass foils) and combinations thereof.

The roll of tape can include a release liner in addition to the backing. Examples of release liners include papers, polymeric film, and woven and nonwoven fabric. The release liner can include a release coating composition including, e.g., silicone, fluorocarbons, carbamate and polyolefins including, e.g., polyethylene and polypropylene.

Backings and, when present, release liners can also include reinforcing agents including, e.g., fibers, filaments (e.g., glass fiber filaments), and saturants, e.g., synthetic rubber latex saturated paper backings. One useful backing includes a polymer impregnated fiber scrim.

Common tape types that can include the masking agent on an edge face include masking tape, electrical tape, duct tape, filament tape, medical tape, and other tapes that are commercially available.

Pressure-sensitive adhesives useful in the invention include normally tacky, pressure-sensitive adhesives known in the art. The adhesive may be a foamed adhesive if desired. The adhesives useful herein are extrudable and typically, though not necessarily, amorphous. Preferred adhesives are normally tacky (at room temperature) pressure-sensitive adhesives.

Pressure-sensitive adhesive compositions are fluid or pumpable at the temperatures used to melt process the tape (e.g., typically 90° C. to 300° C.). Furthermore, these adhesive compositions preferably do not significantly degrade or gel at the temperatures employed during melt processing. Useful adhesive compositions also typically have a melt viscosity of from 1 poise to 100,000 poise. As used herein, the term melt viscosity means the viscosity of the molten material at the processing temperature employed. The adhesives may generally be classified into the following categories:

(1) Random Copolymer adhesives such as those based upon acrylate and/or methacrylate copolymers, α-olefin copolymers, silicone copolymers, chloroprene/acrylonitrile copolymers, and the like.

(2) Block Copolymer adhesives including those based upon linear block copolymers (i.e., A-B and A-B-A type), star block copolymers, comb block copolymers, and the like.

(3) Natural rubber adhesives. A description of useful pressure-sensitive adhesives may be found in Encyclopedia of Polymer Science and Engineering, Vol. 13, Wiley-Interscience Publishers (New York, 1988). Additional description of useful pressure-sensitive adhesives may be found in Encyclopedia of Polymer Science and Technology, Vol. 1, Interscience Publishers (New York, 1964).

The following adhesive compounds, solutions, or emulsions may be used, either alone or in combination, without departing from the scope of this invention. Rubber based adhesives such as, but not limited to, natural rubber, synthetic polyisoprene, styrene-isoprene-styrene block copolymer (SIS), styrene-butadiene-styrene block copolymer (SBS), styrene-ethylene-butylene-styrene block co-polymer (SEBS), styrene-ethylene-propylene-styrene block copolymer (SEPS), styrene butadiene rubber, nitrile rubber, neoprene rubber, butyral and butyl rubber, polyisobutylene, polysulfide rubber, silicone rubber, natural latex rubber, and synthetic latex rubber. Resin-based adhesives such as, but not limited to, polyvinyl acetate, polyvinyl butyral, polyvinyl chloride, acrylic, ethylene vinyl acetate, polyethylene-based, polyolefin based, nylon-based, phenol-based (including formaldehyde-based), urea-based (including formaldehyde-based), epoxy resin, polyurethane-based, rosin-based (including rosin esters), polyterpene-based, polyester, petroleum based, and low molecular weight based adhesives. Inorganic adhesives such as, but not limited to, silicate adhesive and wax adhesives such as, but not limited to, paraffin, natural wax, and bees wax.

Commercially available pressure-sensitive adhesives are also useful in the invention. Examples of these adhesives include, but are not limited to, Avery Dennisons' acrylic adhesive line (including, but not limited to, S8750, S8755 and S8840), Ashland's acrylic adhesive line (including, but not limited to, Aroset 320M, Aroset 1860 & Aroset 1930), Rohm & Haas's acrylic line (including, but not limited to Morstik 610, Morstik 650 & Morstik 837) and Cytec's acrylic adhesive line (including, but not limited to, GMS 4020 & GMS 2953).

Depending upon the nature of the masking agent incorporated into the edge coating, the coating may be a continuous coating such as a film or a discontinuous coating such as a layer of an adhered powder. A discontinuous coating may include the coating present in a pattern, e.g., dots or stripes. The masking agent is applied in an amount that is effective in improving or enhancing the mask line produced when a paint, varnish, paint stripper or other coating compositions is applied to the tape when it is adhered to an adherend. The edge coating includes at least one of a lipophilic agent and/or a flocculating agent as described herein. Edge coated tapes containing a flocculant and/or a lipophilic agent, unlike water-based absorbent materials like SAPs, do not require storage in humidity-controlled packages.

In one embodiment, the lipophilic agent may be a lipophilic polymer, lipophilic resin, or lipophilic particulate. Depending upon the nature of the masking agent, the edge coatings containing lipophilic agents work with polar and non-polar organic solvents and coatings and do not require storage in air-tight containers.

Examples of lipophilic polymers include styrenic polymers and copolymers. More particularly, alkyl styrene polymers include crosslinked or uncrosslinked alkyl styrene polymers. Examples of lipophilic particulates include granulated lipophilic polymers such as, but not limited to, polyisobutylene, styrene-butadiene-styrene, styrene-ethylene-butadiene-styrene and styrene-isoprene-styrene copolymers.

One such particulate is an alkylene styrene polymer particle that is commercially available under the trademark IMBIBER BEADS®. U.S. Pat. No. 4,302,337 discusses generally the IMBIBER BEAD polymers as an oil-swellable latex, i.e., a polymer that swells on contact with oils. In general the chemical composition of the polymers is not critical, but the polymers must show significant swelling; that is, at least 25 percent increase in volume in a period of at least 10 minutes in the organic liquid to which the polymers are required to respond under desired service conditions of temperature and pressure. Alkyl styrene polymers swell very rapidly on contact with aliphatic and/or aromatic hydrocarbons. Generally, the more rapid the swelling of the polymer the more rapid the shutoff when the organic liquid is contacted. Alkyl styrene polymers and copolymers usually show substantial swelling when in contact with so-called Number 2 Diesel oil in less than 1 minute. The alkyl styrene polymer may be cross-linked copolymers of such alkyl styrenes and an alkyl ester derived from $C_1$ to $C_{24}$ alcohol and acrylic or methacrylic acid or mixture thereof, and may include a slight amount of crosslinking agent, preferably in the range of from about 0.01 to 2 percent by weight.

In another embodiment the lipophilic agent is MYCELX®. One such MYCELX is the reaction product of a glyceride and an acrylate or methacrylate polymer. See U.S. Pat. No. 5,698,139 for a description of MYCELX materials where it discusses that the glyceride component of the coagulant composition is preferably a drying oil such as linseed oil, which may be obtained from Cargill, Inc., as Supreme Linseed Oil. The glyceride should comprise from 35 to 40% of the coagulant, most preferably 37%, or, of the intermediate composition poly(linseed oil/isobutyl methacrylate), the drying oil should comprise from 72% to 77%, or most preferably, 74.62%. The polymer component of the coagulant is preferably a poly(isobutyl methacrylate) which may be obtained from Du Pont as Elvacite 2045. The polymer percentage of the coagulant may range from 10% to 15%, or preferably 13%, or, with respect to the intermediate composition poly(linseed oil/isobutyl methacrylate) the polymer should range from 23% to 28%, or preferably 25.38%. The solvent, or diluent component of the coagulant should generally comprise any liquid or mixture of liquids that is able to dissolve or dilute the intermediate coagulant composition poly(glyceride/polymer). The solvent may be an aliphatic hydrocarbon, aromatic hydrocarbon, alcohols, ketones, ethers, aldehydes, phenols, carboxylic acids, carboxylates, synthetic chemicals and naturally occurring substances. Preferably the solvent is 2,2,4-trimethyl-1,3-pentanediol-monoisobutyrate. The preferred amount of the solvent is 50% of the coagulant composition, although, the total solvent percentage of the coagulant composition may range from 45% to 55%.

In another embodiment a solution of MYCELX in limonene sold under the name POWERSOLVE® may be used.

In another embodiment, the lipophilic polymer is a lipophilic polyelectrolyte gel. One example of such a gel is described by Ono, et al., *Nature Materials*, Vol. 6, June, 2007, pp. 429-433 and is a lipophilic polyacrylate (e.g., octadecyl acrylate gel) that is modified to include small amounts (e.g., up to about 5 or 10%) dissociable lipophilic ionic groups. A substituted tetraphenylborate is an example of a lipophilic anion and tetraalkylammonium anions with long (about $C_5$-$C_{20}$ and, more particularly, $C_{18}$) alkyl chains are examples of a lipophilic cation. The lipophilic cation is reacted into the lipophilic acrylate in the form of a monomer prepared by alkylation of tri(n-hexyl)amine with 3-bromo-1-propanol followed by esterification of the hydroxyl group using acryloyl chloride.

Other lipophilic gels can be prepared by substituting other lipophilic anions and cations depending upon the solvent in the coating that is targeted for masking. For example, fluorinated solvents may warrant the use of polyelectrolyte gels containing fluorinated substituents, e.g., perfluoroalkyl groups in the lipophilic anion and/or cation. Similarly, polystyrene or polybutadiene substituent chains may be incorporated into the gels to enhance masking of oil-based coatings.

The edge coating containing the lipophilic polymer can be applied as a solution, a dispersion, or a powder coating. It can be applied directly to the edge of the tape, as the tape is slit using, for example, a wicking device in conjunction with the slitting blade, or the edge coating can be applied to the cut surface of a roll of tape using any conventional coating technique such as spray coating or brush coating. Solid particulate edge coatings when applied in the process adhere to exposed adhesive at the edge face of the tape.

In another embodiment, the edge coating contains a flocculant. The flocculant interacts with the applied coating and causes the coating to coagulate or the pigment to fall out of suspension. One such flocculant is aluminum chlorohydrate. It may be applied to the edge of the tape as an aqueous solution. Aluminum chlorohydrate is commercially-available as a solution under the trade name EC-409 from Southern Water Consultants, Inc. While not desiring to be bound by the theory, it appears that the aluminum chlorohydrate may interact with the pigment in the paint, causing the pigment to flocculate along the edge of the tape thereby creating a barrier which prevents infiltration of the tape backing and/or the interface with the adherend as discussed above. Other flocculants may interact chemically and/or mechanically with the paint, varnish, or other coating compositions to block such compositions from passing between the adhesive of the tape and the adherend. A mechanical interaction can include impeding the travel of the coating composition through the adhesive/adherend interface.

In addition to or as an alternative to aluminum chlorohydrate, other flocculants or their equivalents can be used in the edge coatings of the invention. Representative examples of flocculants include multivalent salts and acidic or ionic polymers. Representative examples include inorganic flocculants (e.g. aluminum hydroxide, aluminum sulfate, ferrous sulfate, ferrous chloride, ferric sulfate, ferric hydroxide, calcium sulfate, calcium carbonate, calcium hydroxide, $Fe_2(SO_4)_3FeCl_3$, etc.) and organic flocculants (e.g. starch, gelatin, sodium alginate, a polyacrylamide, chitosan, etc.). Particularly preferably are the flocculants containing iron and aluminum or a combination thereof.

A cure additive may be added to the edge coatings disclosed herein to promote adhesion in radiation curable coatings or to promote crosslinking. Suitable cure additives include, but are not limited to, acidic acrylate oligomer, ethylene glycol dimethacrylate, hexamethoxy methyl melamine, n-methylol acrylamide, and polyester acrylate oligomer. Acidic acrylate oligomer is an adhesion promoter in UV-curable coatings and laminating adhesives. One commercially available acidic acrylate oligomer is available from Sartomer Company, Inc. as CN147. Hexamethoxy methyl melamine is a versatile crosslinking agent for a wide range of polymeric materials, both organosoluble and water borne. One commercially available hexamethoxy methyl melamine is available from Cytec Industries, Inc as Cymel® 303. Polyester acrylate oligomer is a hyperbranched oligomer suited to UV/EB-cured coatings. One commercially available polyester acrylate oligomer is available from Sartomer Company, Inc. as CN2303.

The edge coating containing the flocculant can be applied as a solution, a dispersion, or a powder coating. It can be applied directly to the edge face of the tape using a variety of methods including, contacting the edge face with a cloth, sponge or brush, roll coating, spray coating, dip coating, or contacting the edge face as the tape is slit using, for example, a wicking device in conjunction with the slitting blade. Preferably the application of the edge coating containing the flocculant is as a solution or dispersion.

In another embodiment, the tape is a foil tape having a foil layer with an adhesive on one of its major surfaces and having a masking agent applied to one or both edge faces of the tape. The foil layer may be aluminum, lead, copper, stainless steel, brass foil, or combinations thereof. In this embodiment, the foil tape has the masking agent applied to enhance the masking ability of the tape. The masking agent prevents paints, varnishes, paint strippers and other coating compositions, in particular corrosive materials, from infiltrating the tape substrate or the interface between the tape and the adherend thereby protecting the masked surface from potentially harmful exposure to the corrosive material. The masking agent may be a flocculent, for example, but not limited to, calcium carbonate, talc clays, silicas, various PTFEs, silicones, and super absorbent polymers. The flocculant may be applied to the tape as 100% solids or as part of a solution.

The edge coating in addition to the masking agent may include additives, e.g., fillers, surfactants, pH modifiers, pigment, dispersants, defoaming agents, wetting agents, and combinations thereof.

The coating composition and the coating weight applied to the edge face of the roll of tape are selected based upon a variety of factors related to the roll of tape including, e.g., the adhesive composition, the coating weight of the adhesive composition and the backing of the roll of tape. The coating weight applied to the edge face of the roll of tape is preferably sufficiently great to uniformly coat the edge face with enough masking agent to chemically or mechanically block the paint, varnish, corrosive, or other coating composition from penetrating the interface between the adhesive and the adherend, yet sufficiently small to provide a frangible coating. Surface variations present on the edge face of a roll of tape will affect the coating weight necessary for applying the masking agent to the edge face. Surface variations can result from a variety of factors including, e.g., uneven tape winding and cutting processes. The coating weight can be varied depending upon the surface variations present on the edge face. Suitable dry coating weights range from about 0.1 $g/m^2$ to about 50 $g/m^2$.

Coatings applied to the edge face of the tape can take the form of solid particulates or liquids. The particle size of solid particles can range from 0-100 microns, and preferably from 0-50 microns. Liquid coating can range from about 0.1-100% solids depending on the required solution viscosity and drying time required for a given coating process. In one embodiment, the liquid coating range may be from about 40-100% solids.

The invention is further illustrated by the following non-limiting examples.

EXAMPLE 1

An EC-409 aluminum chlorohydrate solution, a 40% solution in water, was applied to the edge of a roll of lathe-cut masking tape using a foam brush. Excess coating was wiped from the edge surface. The rolls were dried at 140° F. for 5 minutes and were dry to the touch. The aluminum chlorohydrate was applied to the edge of the tape at a dry weight of 0.28 $g/m^2 \pm 0.06$.

EXAMPLE 2

In accordance with the other embodiments of this disclosure, other edge coating were applied to tape rolls and evaluated based upon the sharpness of the edge or masking line that the tape provided. These edge coating agents are shown in the table below. Liquid edge coatings were applied as 40% solutions of masking agent in water to the edge of a roll of lathe-cut masking tape using a foam brush and pressure. Excess coating was wiped from the edge surface. The rolls were dried at 140° F. for 5 minutes and were dry to the touch. Particulate edge coatings were applied by twisting the edge face in a shallow pan containing the solid matter to pick up and adhere to the edge face. Excess particles were wiped away form the edge face with a lint-free cloth.

TABLE 1

| Masking Agent | Cure Additive | Form Applied |
|---|---|---|
| sodium polyacrylate | N/A | granules |
| calcium oxide | N/A | powder |
| aluminum chlorohydrate solution | N/A | aqueous |
| polymer of 2-propenoic acid | hexamethoxy methyl melamine | aqueous |
| sodium aluminate | N/A | granules |
| polymer of 2-propenoic acid | N/A | aqueous |
| polyacrylic acid | acidic acrylate oligomer | aqueous |
| cyclodextrin | N/A | granules |
| silica gel | N/A | granules |
| solids solution of LMW styrene/acrylic copolymer | n-methylol acrylamide | aqueous |
| polymer of 2-propenoic acid | N/A | aqueous |
| polyacrylic acid | ethylene glycol dimethacrylate | aqueous |
| microcrystalline amber wax | N/A | toluene soln. |
| micronized polytertrafluoroethylene | N/A | powder |
| polymer of 2-propenoic acid | acidic acrylate oligomer | aqueous |
| solids solution of LMW styrene/acrylic copolymer | ethylene glycol dimethacrylate | aqueous |
| acrylic dispersion | N/A | aq. emulsion |
| calcium stearate dispersion | N/A | aq. dispersion |
| styrene acrylic copolymer solution | hexamethoxy methyl melamine | aqueous |
| styrene acrylic copolymer solution | hexamethoxy methyl melamine | aqueous |
| micronized polyethylene powders | N/A | powder |
| polymer of 2-propenoic acid | polyester acrylate oligomer | aqueous |
| sodium silicate | N/A | aqueous |
| bentonite clay | N/A | powder |

EXAMPLE 3

In another example, IMBIBER BEADS®, an alkylene styrene polymer were applied to the edge face of a roll of tape by twisting and pressing the edge face in a shallow pan containing the solid matter. Excess particles were knocked away with a lint-free cloth.

EXAMPLE 4

In another example, standard adhesive industry grade calcium carbonate was applied to the edge face of a roll of foil tape by twisting and pressing the edge face on a flat surface containing the solid matter. Excess material was wiped away with a lint-free cloth.

In addition to adhesive tapes, it is to be understood that paper or synthetic drop cloths or masking sheets may also benefit from the present invention. Paper and synthetic drop cloths or masking sheets are thin sheets of material that are used in masking large areas during such operations as painting and cleaning with solvents. These drop cloths and masking sheets are typically much wider than the adhesive tapes used in masking objects and may have adhesives over their entire bottom surface, over only a portion of their bottom surface, or not at all.

The embodiments of this invention described in detail and by reference to specific exemplary embodiments of masking tapes with edge coatings are within the scope of the appended claims. It is contemplated that numerous other modifications and variations of the edge coatings and masking tapes having edge coatings may be created taking advantage of the disclosed approach. In short, it is the applicant's intention that the scope of the patent issuing herefrom be limited only by the scope of the appended claims.

What is claimed is:

1. A tape comprising:
a substrate having a pressure sensitive adhesive layer applied thereto, the substrate and the adhesive together, after slitting, providing at least one cut surface that forms an edge face of the tape; and
an edge coating that has been applied directly on the at least one cut surface of the tape after slitting, the edge coating including an inorganic salt flocculating agent;
wherein the inorganic salt flocculating agent includes at least one member of the group consisting of aluminum chlorohydrate, aluminum hydroxide, aluminum sulfate, ferrous sulfate, ferrous sulfide, ferric sulfate, ferric hydroxide, calcium sulfate, calcium carbonate, calcium hydroxide and $Fe_2(SO_4)_3FeCl_3$;
wherein the edge coating prevents or reduces the tendency for an applied paint or coating contacting the cut surface from being absorbed into the substrate or from penetrating the interface between the adhesive layer and an adherend.

2. The tape of claim 1 wherein the edge coating is applied to both cut surfaces of the tape.

3. The tape of claim 1 wherein the substrate is paper.

4. The tape of claim 1 wherein the adhesive is an acrylic adhesive, a block copolymer adhesive, or a natural rubber adhesive.

5. The tape of claim 1 wherein the substrate is foil.

6. The tape of claim 1 wherein the inorganic salt flocculating agent includes aluminum chlorohydrate.

7. The tape of claim 1 wherein the edge coating is applied as an aqueous solution.

8. The tape of claim 7 wherein the aqueous solution has a concentration of at least about 40% of the inorganic salt flocculating agent.

9. The tape of claim 8 wherein the edge coating has a dry coating weight of about 0.1 $g/m^2$ to about 50 $g/m^2$.

10. The tape of claim 1 wherein the edge coating is applied as a dispersion or a powder.

11. The tape of claim 1 wherein the edge coating has a dry coating weight of about 0.1 $g/m^2$ to about 50 $g/m^2$.

* * * * *